Dec. 8, 1959 C. B. MANSKY ET AL 2,916,726

DATA STORAGE APPARATUS

Filed March 4, 1955 2 Sheets-Sheet 1

INVENTOR.
CLARENCE B. MANSKY
ISAAC M. SHEAFFER JR.

BY Carl Fissell Jr.

AGENT

INVENTOR.
CLARENCE B. MANSKY
ISAAC M. SHEAFFER JR.

BY Carl Fissell Jr.

AGENT 2,916,726

DATA STORAGE APPARATUS

Clarence B. Mansky, Strafford, and Isaac M. Sheaffer, Jr., Bryn Mawr, Pa., assignors to Burroughs Corporation, Detroit, Mich., a corporation of Michigan Application March 4, 1955, Serial No. 492,276

2 Claims. (Cl. 340—174)

This invention relates to improvements in data storage apparatus and, more particularly, to magnetic recording devices such as magnetic drums for use with business machines, computers and the like.

It has been conventional practice up to the present time to employ one or more rotatable magnetic drums as a data storage medium in certain types of business calculating machines, computers and the like. The periphery of the drum is in some instances coated with a magnetizable material, such as iron oxide. Recently, it has been proposed to cover the periphery of the drum with a magnetic tape, for example, iron oxide coated paper tape. In most, if not all, of these earlier drums, the surface speed of the drum is quite high ranging from 200 to 1500 inches per second. Generally speaking the speed of rotation of the drum is limited only by the speed of the driving motor used therewith.

In the operation of magnetic recording drums it is normal practice to drive the drum at a maximum conveniently high speed and obtain the necessary desired synchronous operation with external signals. The desire for simplicity in the driving mechanism restricts the practicable range of speed which can be obtained. The magnetic transducers, i.e., recording, reading and erasing heads employed therewith are required to be spaced from the recording surface by only a very small distance often of the order of not more than .001 inch. It is clear, therefore, that the requirement for smooth running operation and lack of eccentricity of such a recording drum places considerable limitations on the mechanical design, and in general, for a drum of a given large diameter, attempts to increase the recording area by means of extending the axial length thereof have resulted in failure to meet these mechanical requirements.

Reduction of the diameter of such a drum coupled with a more than proportional increase in the axial length in general enables the storage area to be increased and the requirements for accurate running to be made. However, a high degree of angular accuracy of positioning is thus required to be maintained throughout a considerable axial length, together with a considerable accuracy of longitudinal positioning of the drum. The mechanical rigidity of the drum and driving assembly must accordingly be very great and there must be no torsional distortion set up in any of its constituent parts including the drum itself. The permissible tolerance of eccentricity is also very small, being of the order of .0001 inch or less as greater eccentricity will result in intolerable variations in the amplitude of the recorded and/or reproduced signal as well as possible damage to the closely spaced transducer assemblies.

It is an important object, therefore, of the present invention to provide an improved bearing mounting for a magnetic drum assembly.

It is another important object of the invention to provide a magnetic drum assembly wherein suitable rigidity of constituent parts is obtained by novel design and arrangement of parts.

It is a further important object of the invention to provide a novel magnetic drum assembly of low cost construction which is simple to fabricate yet accurate and having tolerances of eccentricity of .0001 or less.

Other objects and advantages of the invention will be apparent from the following specification and accompanying drawings wherein.

Figure 1:
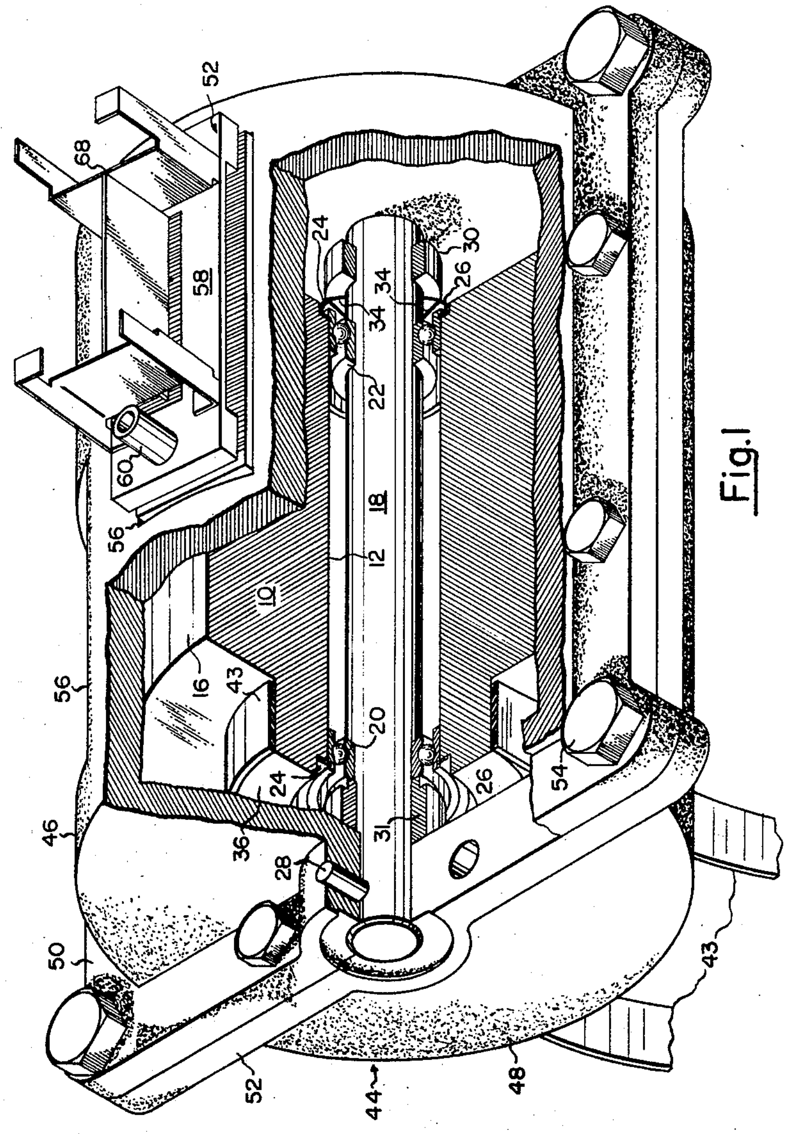
Fig. 1 is a perspective view of a drum assembly constructed in accordance with the invention and partially broken away in section to show the internal arrangement of parts.
Figure 3:
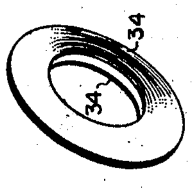
Figure 3 is a perspective view of a spring means employed in the drum assembly.
Figure 2:
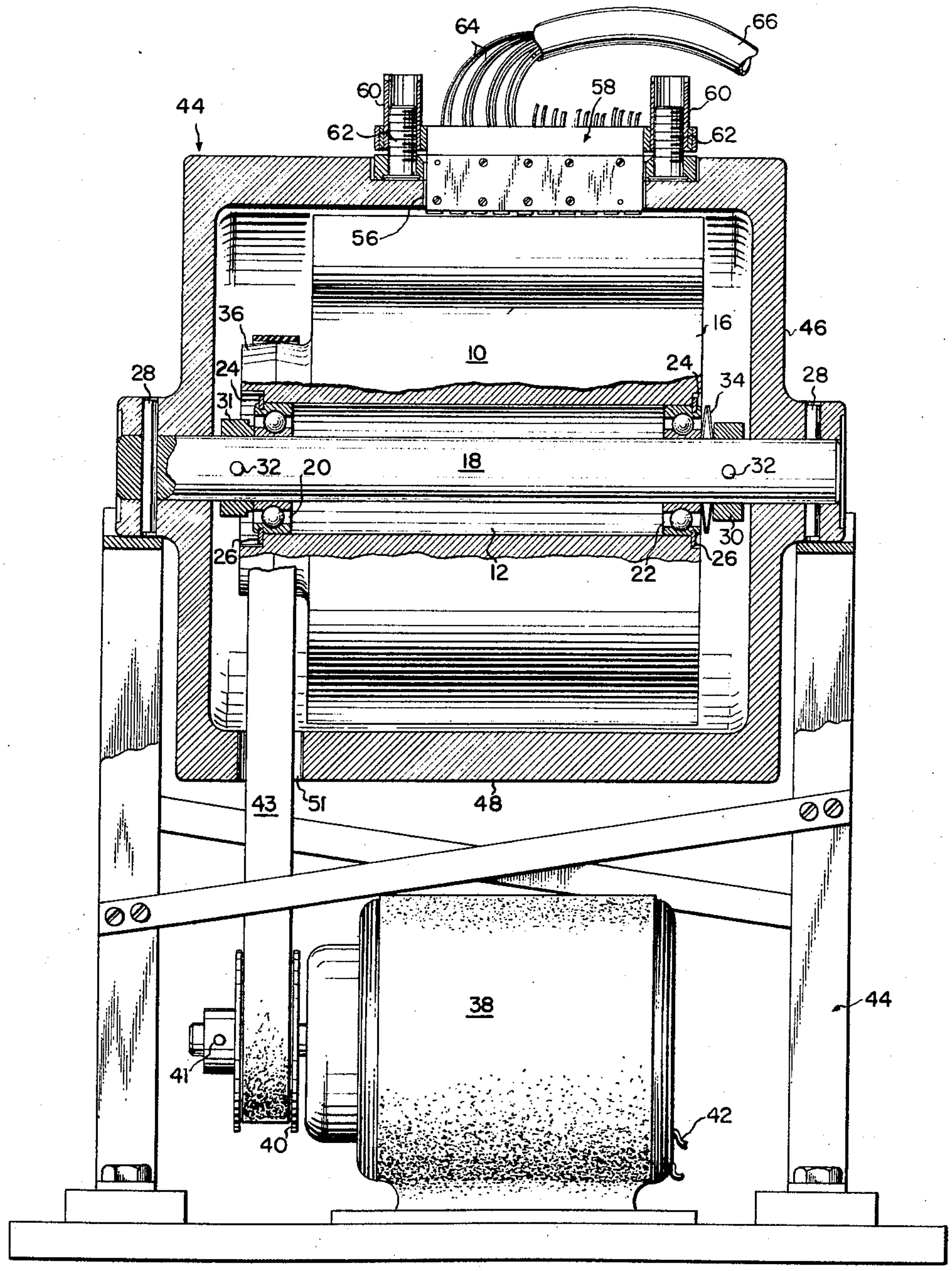
Fig. 2 is a side elevation of an apparatus showing the drum assembly, and associated supporting and driving equipment and having the drum assembly partially broken away in section to reveal the shaft mounting thereof.

Referring to the drawings and to Figs. 1 and 2 thereof which will be discussed simultaneously, the data storage apparatus of the present invention is seen to comprise a substantially solid cylindrical member 10 provided with a smooth regular axial bore 12 of constant diameter. The drum 10 is or may be fabricated of any suitable non-magnetic material and is accurately machined and provided, before fabrication into the present assembly, with a coating 16 of magnetizable material such as iron oxide around its peripheral surface functioning as the recording medium.

The rotatable drum, as a separate sub-assembly, is supported upon a solid, central shaft 18 extending straight through the bore 12 thereof by means of two ball bearing assemblies 20 and 22 disposed at opposite ends thereof. The outer races of the ball bearing assemblies are adapted to be received within the hollow bore 12 of the drum in a press fit relation therein. The bore 12 of the drum is widened slightly at each of its opposite ends to form an annular ledge 24 for receiving a bearing retaining ring 26 which is mounted and seated on the ledge to abut the peripheral surface of the outer bearing race. Prior to installing the shaft, the bearings 20 and 22 are pressed into the drum until the retaining rings 26—26, which may be integral therewith, are tightly abutting the side walls of ledges 24—24. With this type of an assembly, standard bearings can thus be utilized and advantage can be taken of their ready availability and relatively low cost. Also, such bearings are usually provided with self-contained shields or seals and retaining rings which simplify the design of the assembly by eliminating the requirement for providing external bearing seals and lubrication of the bearings. The self-contained retaining rings also simplify the design further. By eliminating the shoulders ordinarily disposed between the two bores where two bores are utilized for holding the outer races of the bearings a straight through bore of uniform diameter, as herein described, may be utilized.

The shaft 18 is adapted to be secured in a fixed position by means of a rigid pin 28 which is disposed at one end thereof so as to secure the shaft to its supporting enclosure as will be described later on. Two annular members or collars 30 and 31 are secured by means of the pins 32—32 therethrough, one on each end section of the central shaft 18 and immediately adjacent to the nearest end of the drum.

In order to apply a pre-load to the bearings so that all clearance and play in the bearings is eliminated and in order to allow for the slight spacing differential due to fabrication tolerances and for any required axial movement of the shaft relative to the drum or the supporting enclosure due to the differences caused by slight expansion and contraction of parts, a pair of resilient expansible washers 34—34 are introduced at one end of the drum between the exposed side of the bearing 22 and the inwardly facing side portion of the adjacent collar 30. The pre-load on the bearings of, for example, twenty pounds, provided by the two washers produces pressure on the drum parallel to the axis of the shaft 18 and in this manner prevents sidewise wobble or yawing of the drum. Application of such a pre-load simplifies the construction of the drum assembly by avoiding the necessity of using a threaded shaft and a nut with the close tolerances normally involved in order to provide a bearing adjustment of this type. The tedious adjustment that is ordinarily associated with a threaded shaft assembly is also eliminated.

Since a non-rotating shaft is used in the present invention, this shaft may be rigidly clamped extremely close to the bearings 20 and 22. Clamping the shaft in the manner described hereinafter results in a much stiffer assembly for a given shaft size than with a rotating shaft. This results in less shaft deflection and higher natural frequencies. Another advantageous feature of the foregoing arrangement is the simplification of design resulting therefrom since no rigid connection between the shaft 18 and the drum 10 is required. Further, the non-rotating or dead shaft arrangement produces a subassembly, namely, the drum, bearings and shaft, which can be machine finished, coated with magnetic material as desired, balanced conveniently while a sub-assembly and removably installed as a separate unit in supporting structure. The machine finishing of the drum as an assembly, while mounted in its own pre-loaded bearings, permits easy attainment of concentricities less than .0001 inch.

Since the use of so-called precision bearings in and of themselves do not in actual practice offer sufficient accuracy and precision for the drum, it is necessary, as before mentioned, to machine finish the drum after its assembly in the bearings in order to obtain the desired precision. However, the requirement for machine finish makes it at once apparent that the use of precision bearings introduces an unwarranted additional cost factor into the design. A considerable saving can therefore be effected by utilizing the hereinabove mentioned conventional standard, relatively inexpensive non-precision bearings which are available with individual shields already in place or integral therewith and which are adapted to be self-lubricating. The incorporation of the ready available shielded and self-lubricated bearings with the dead or fixed shaft and the resulting more rigid shaft support enables the attainment of the aforementioned very close tolerances easily and inexpensively.

The drum 10 is adapted to be rotatively driven from an external driving source by providing the drum with a pulley surface or belt hub 36 which is integral therewith and disposed at one end thereof for convenient coupling of the driving means thereto. To increase the precision, the hub is disposed on the drum in concentric relation to one of the bearings. This type of construction permits the driving source to be located remote from the drum assembly itself. The arrangement of the belt hub disposed directly over the drum bearing avoids flexural distortion problems which would necessarily arise if the drum were to be driven through a driving connection or link connected to the shaft 18 at a point spaced from one of its bearing suspensions.

An electric driving motor 38, which is provided with a pulley of conventional type secured to the drive shaft of the motor by means of a pin 41, is adapted to be energized from a source of electric power (not shown). The motor and pulley assembly are disposed in suitable fashion on the base of a supporting structure 44 which may be located within the housing or enclosure of a calculating or other type business machine. The pulley 40 and the hub 36 are disposed in parallel axial alignment. A conventional flat belt 43 is utilized as the connecting link or driving coupling from the pulley 40 to the drum hub 36. Use of the belt drive for transmitting driving torque from the motor to the drum insulates the driving motor from the drum thereby tending to reduce any thermal effects which may be set up due to the heat of the motor. The belt drive also permits the utilization of practically any standard available motor of the proper speed and horsepower rating. An additional advantage of this type of drive is the adaptability thereof to a central driving source within the machine with which the drum assembly is to be used.

A housing 44 is utilized to provide a rigid supporting structure for the drum assembly. The housing, which is adapted to enclose and thereby shield and protect the drum surface including the bearings from the atmosphere, is preferably fabricated as desired, in two complementary halves 46 and 48 in order to simplify construction thereof. The two part housing or enclosure also permits simple and rapid assembly of the drum and its associated parts therein. An aperture 51 is provided in the curved portion of the bottom half 48 of the enclosure and is disposed relatively close to one end of the housing. The aperture provides an opening into the housing for admitting the drive belt 43 so that the latter may be disposed over the hub of the drum for drivingly coupling the drum to the motor.

The two complementary halves of the drum housing 46 and 48 are each provided with a flanged edge portion identified at 50 and 52 respectively in Fig. 1, integrally formed therewith at the time of fabrication. The two flanges extend completely around their respective halves of the drum housing and are formed and located on the halves so as to be brought into precise abutment when the two halves are assembled into the housing. At spaced intervals, the two flanges are provided with registering holes through which bolts 54 extend to tightly clamp the two halves of the housing together.

By using shielded bearings in the manner herein described, it is unnecessary to provide end caps for the shaft ends of a device of this type in order to seal the housing, the exposed shaft ends and the bearings from the ingress of dust, dirt and other foreign material which might have a deleterious effect.

At staggered intervals around the outer periphery of the housing, a number of rectangularly shaped apertures 56 are provided in order to accommodate the magnetic transducers, i.e., read, record and erase heads. One such head is shown in the drawings and is identified generally at 58. The transducers 58 may take the form of a multiple head package assembly, as shown in Fig. 2. Each head assembly consists of a number of separate magnetic core elements, a portion of each one of which is adapted to project through the aperture 56 into the clearance between the outer peripheral surface of the drum and the inner surface of the housing. Adjustment of the spacing between the transducer head assembly and the peripheral surface of the drum is provided by any suitable means, such, for example, as internal differentially threaded sleeves 60 adjustably threadedly mounted on the housing 44 by means of projecting complementary threaded studs 62. Each head assembly is provided with lateral flanges which are secured to the sleeves 60—60.

The electrical leads 64 which are utilized as input-output means for interconnection of the transducers 58 to the various amplifiers and other associated electronic gear (not shown), are brought out from the exposed outer portion of the head assembly by means of an electrically insulating cable 66. Suitable supporting brackets 68, shown only in Fig. 1, may also be provided for mounting associated electrical components to the transducer assembly.

There has thus been described a data storage apparatus including a magnetic drum which can be simply and relatively inexpensively fabricated from standard parts and which when assembled into a unit in the novel fashion herein disclosed, provides in combination a device having the rigidity and strength required for incorporation into computing and calculating business machines and the like. A number of experimental embodiments of the present invention have resulted in magnetic drums with less than .0001 inch runout, i.e., the eccentricity of the shaft was kept within that tolerance.

What is claimed is:

1. Data storage apparatus comprising: a substantially solid cylindrical drum member formed of non-magnetic material, said drum having an axial bore therethrough and an integral end portion of reduced diameter for driving said drum member; magnetizable material disposed on the surface of said drum; a shaft of less diameter than said bore extending through said bore and beyond the ends thereof; bearing means positioned at the ends of said bore and slidably mounting said cylindrical member on said shaft for rotation thereabout; means on and concentric with said shaft engaging said bearings securing the position of said drum on said shaft, said securing means including a resilient compressible annular member positioned around said shaft at one end of said drum and exerting pressure against said bearing in an axial direction yet permitting axial expansion and contraction of said drum member along said shaft; a housing for enclosing said drum comprising, two complementary semi-circular halves having flanged edge portions, means clamping said edge portions together, each half of said housing being provided with a plurality of rectangular apertures therein, the longer dimension of said apertures being substantially parallel with said shaft axis, a radial recess formed in each of said flanged edge portions and cooperating to receive the ends of said shaft to support said drum within said housing, and means securing said shaft within said radial recess in a manner preventing rotation of said shaft; drive means for said drum comprising, a rotatable element mounted outside of said drum, means for rotating said element and means extending into said housing through an aperture therein and drivingly connecting said rotatable element with the integral reduced end portion of said drum; and a plurality of magnetic heads secured to said housing and extending through said rectangular apertures into close proximity with the magnetizable material disposed on the surface of said drum.

2. Data storage apparatus comprising: a substantially solid cylindrical drum member formed of non-magnetic material, said drum having an axial bore therethrough and an integral end portion of reduced diameter, the central surface area of said end portion being provided with a slight axial curvature for retaining a driving element thereon, magnetizable material disposed on the peripheral surface of said drum, a shaft of less diameter than said bore extending through said bore and beyond the ends thereof; bearing means positioned at the ends of said bore and slidably mounting said cylindrical member on said shaft for rotation thereabout, one of said bearings being d'sposed concentrically with said integral end portion, means on said shaft adjacent said bearings for locating said drum on said shaft, a housing for said drum comprising, complementary semi-circular portions having flanged edge portions, means clamping said edge portions together, means formed in certain of said edge portions and cooperating to receive the ends of said shaft to support said drum within said housing, and means securing said shaft to said last mentioned supporting means in a manner preventing rotation of said shaft, drive means for said drum comprising, a rotatable element mounted outside of said drum, means for rotating said element, and endless belt means extending into said housing through an aperture therein and operatively engaging the curved surface of said integral end portion of said drum, a plurality of magnetic heads extending through apertures in said housing and into close proximity with the magnetizable material disposed on the surface of said drum, and means adjustably mounting said heads on said housing.

References Cited in the file of this patent

UNITED STATES PATENTS

| | | |
|---|---|---|
| 1,362,910 | Zoeller et al. | Dec. 21, 1920 |
| 1,517,060 | Hanson | Nov. 25, 1924 |
| 1,770,113 | Stampf | July 8, 1930 |
| 2,617,705 | Coombs | Nov. 11, 1952 |
| 2,694,192 | Dean | Nov. 9, 1954 |
| 2,708,693 | Hendrickson | May 17, 1955 |
| 2,810,622 | Brown et al. | Oct. 22, 1957 |